(12) United States Patent
Tauber

(10) Patent No.: US 11,107,609 B2
(45) Date of Patent: Aug. 31, 2021

(54) CONTAMINATION PROTECTION FOR HIGH-VOLTAGE INSULATORS

(71) Applicant: BAYERNWERK NETZ GMBH, Regensburg (DE)

(72) Inventor: Wolfgang Tauber, Eschenbach (DE)

(73) Assignee: BAYERNWERK NETZ GMBH, Regensburg (DE)

( * ) Notice: Subject to any disclaimer, the term of this patent is extended or adjusted under 35 U.S.C. 154(b) by 0 days.

(21) Appl. No.: 17/058,775

(22) PCT Filed: May 27, 2019

(86) PCT No.: PCT/EP2019/063630
§ 371 (c)(1),
(2) Date: Nov. 25, 2020

(87) PCT Pub. No.: WO2019/228968
PCT Pub. Date: Dec. 5, 2019

(65) Prior Publication Data
US 2021/0202135 A1 Jul. 1, 2021

(30) Foreign Application Priority Data

May 30, 2018 (EP) ..................................... 18175021

(51) Int. Cl.
*H01B 17/00* (2006.01)
*H01B 17/62* (2006.01)
*H02G 1/02* (2006.01)

(52) U.S. Cl.
CPC ............... *H01B 17/62* (2013.01); *H02G 1/02* (2013.01)

(58) Field of Classification Search
CPC . H02G 7/00; H02G 1/02; H01B 17/00; H01B 19/00; H01B 17/005; H01B 17/56;
(Continued)

(56) References Cited

U.S. PATENT DOCUMENTS 5,446,242 A * 8/1995 Barrett ................... H01B 17/14
174/137 R
5,650,594 A * 7/1997 Urnovitz ................. H01F 27/02
174/139
(Continued)

FOREIGN PATENT DOCUMENTS

CN     203826142 U    9/2014
CN     104200935 A    12/2014
(Continued)

OTHER PUBLICATIONS

International Search Report and Written Opinion, International Patent Application No. PCT/EP2019/063630, dated Jun. 19, 2019, 13 pages.

*Primary Examiner* — Angel R Estrada
(74) *Attorney, Agent, or Firm* — Casimir Jones, S.C.; Brian F. Bradley

(57) ABSTRACT

The invention relates to a contamination protection device (10) for high-voltage insulators (3), and to an assembly of a contamination protection device (10) and a high-voltage insulator (10). The contamination protection device (10) is designed for fastening to the insulator cap (5) of the high-voltage insulator (3) and has a protective shield (11), which extends radially around a feed-through opening (12) for the connection element (7) of the insulator cap (5), the feed-through opening (12) being surrounded, on the one side of the protective shield (11), by a fastening region (23) for interlocking connection to the insulator cap (5). On the other side of the protective shield (11), two eyes (14) for the insertion of a tab element (30) are provided and a tab element (30) is provided. The eyes (14) are arranged in such a way that the tab element (30) extends over the feed-through opening (12) after having been inserted

20 Claims, 5 Drawing Sheets

Figure 1:
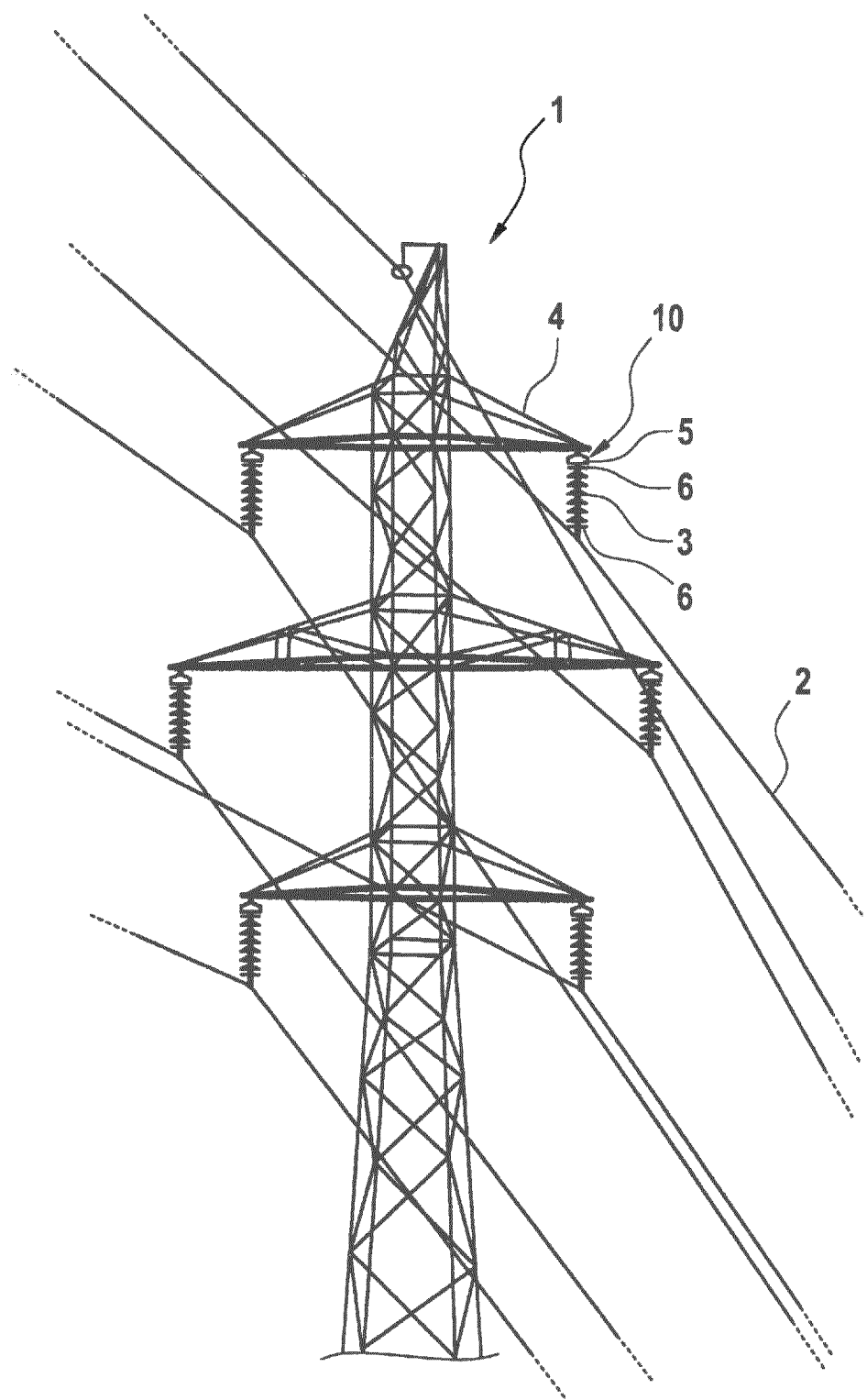

(58) Field of Classification Search
CPC . H01B 17/26; H01B 7/00; H01B 1/06; H01B 17/62; H01F 27/02; H01F 27/00; H05K 5/03; H05K 5/02; H05K 5/00; H01R 4/70; H02B 1/06; H02B 1/063; H02B 1/14; H01H 31/00; H01H 9/02; H01H 9/0264; H01H 31/006; H01H 85/185; H01H 21/165; H01H 31/122; H01H 31/127
USPC .. 174/32, 152 G, 153 G, 135, 152 R, 138 R, 174/139, 138 F, 137 R, 5 R, 14 BH, 142, 174/5 SB, 5 SG; 337/168, 202, 186, 414; 361/232

See application file for complete search history.

(56) References Cited

U.S. PATENT DOCUMENTS

| | | | | |
|---|---|---|---|---|
| 5,679,922 A * | 10/1997 | Harben | ............ | H01B 17/00 174/138 R |
| 5,834,686 A * | 11/1998 | Barrett | ............ | H02G 7/00 174/5 R |
| 5,864,096 A * | 1/1999 | Williams | ............ | H01B 17/00 174/139 |
| D432,742 S * | 10/2000 | Puigcerver | ............ | D30/199 |
| 6,248,956 B1 * | 6/2001 | Cook | ............ | H01B 17/00 174/155 |
| 6,878,883 B1 * | 4/2005 | Rauckman | ............ | H01B 17/00 174/135 |
| 7,297,869 B2 * | 11/2007 | Hiller | ............ | H01B 17/00 174/138 F |
| 7,541,546 B2 * | 6/2009 | Vojtila | ............ | B60M 1/04 174/138 E |
| 8,115,102 B2 * | 2/2012 | Frye | ............ | H01B 17/00 174/138 E |
| 8,957,314 B2 * | 2/2015 | Niles | ............ | H02G 7/00 174/140 H |
| 9,413,153 B2 * | 8/2016 | Spencer | ............ | H01B 17/00 |
| 10,566,166 B1 * | 2/2020 | Lynch | ............ | H01H 31/006 |

FOREIGN PATENT DOCUMENTS

| | | |
|---|---|---|
| CN | 105028385 A | 11/2015 |
| EA | 027265 B1 | 7/2017 |
| JP | 2003189447 A | 7/2003 |

* cited by examiner

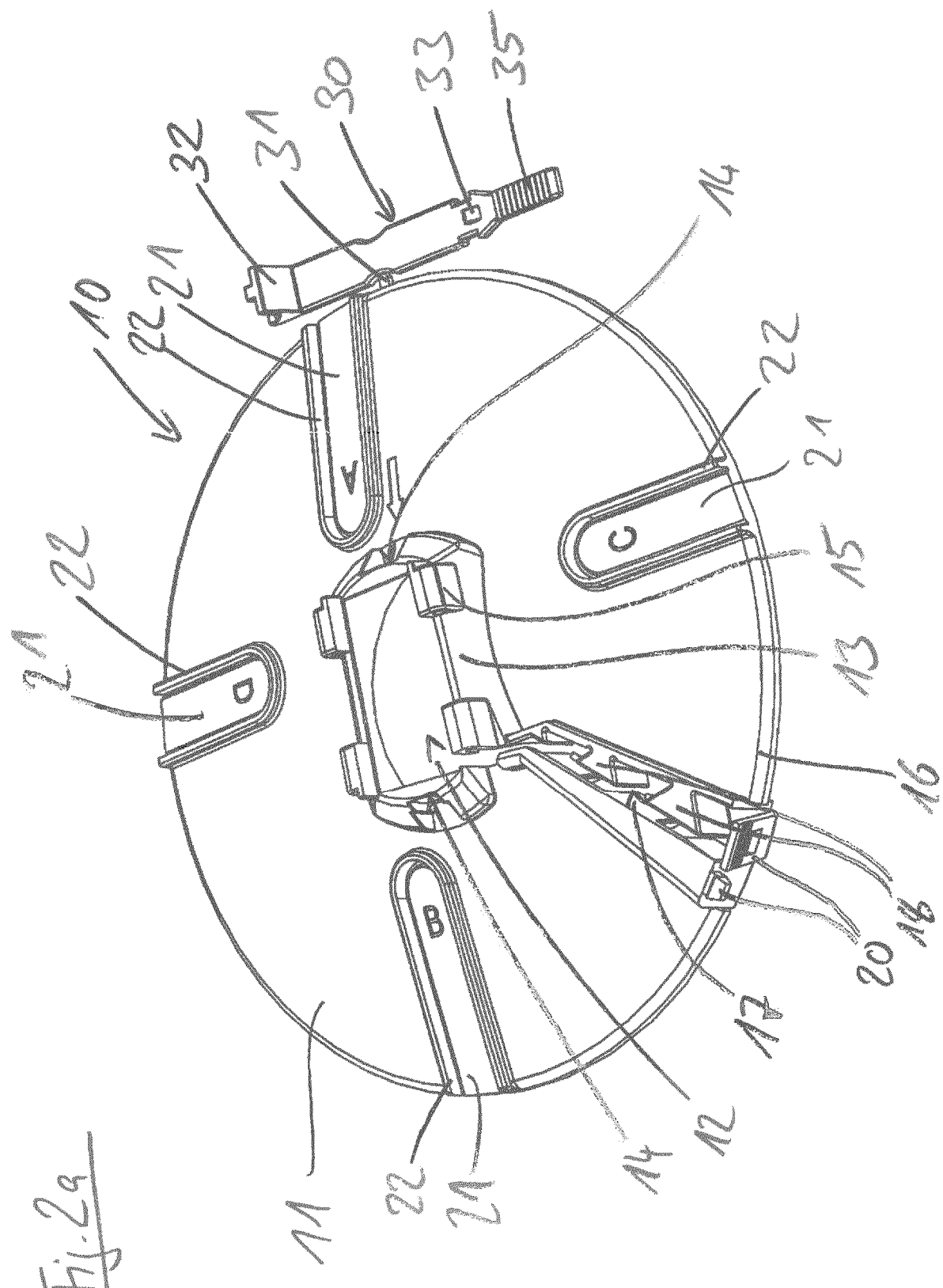

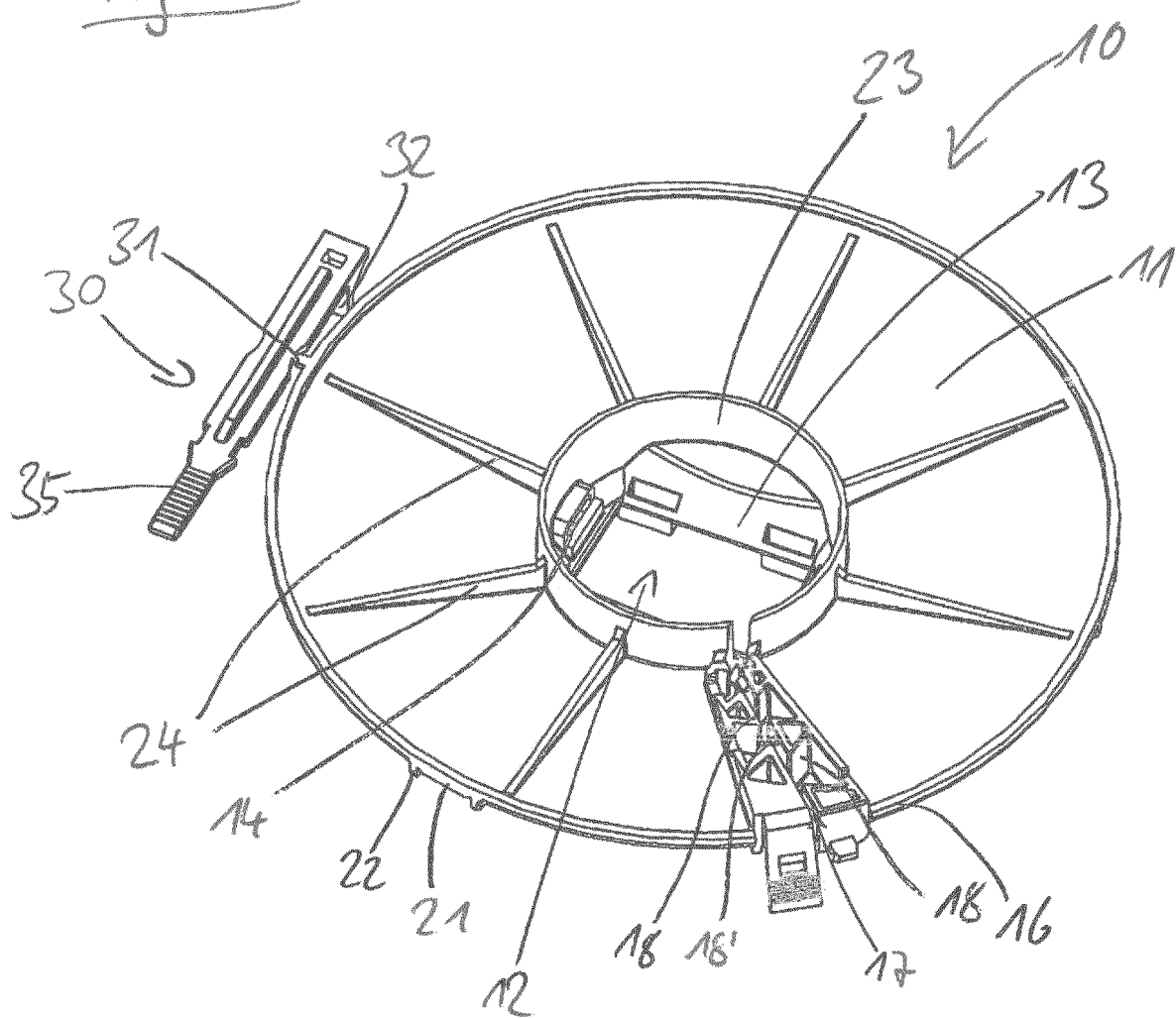

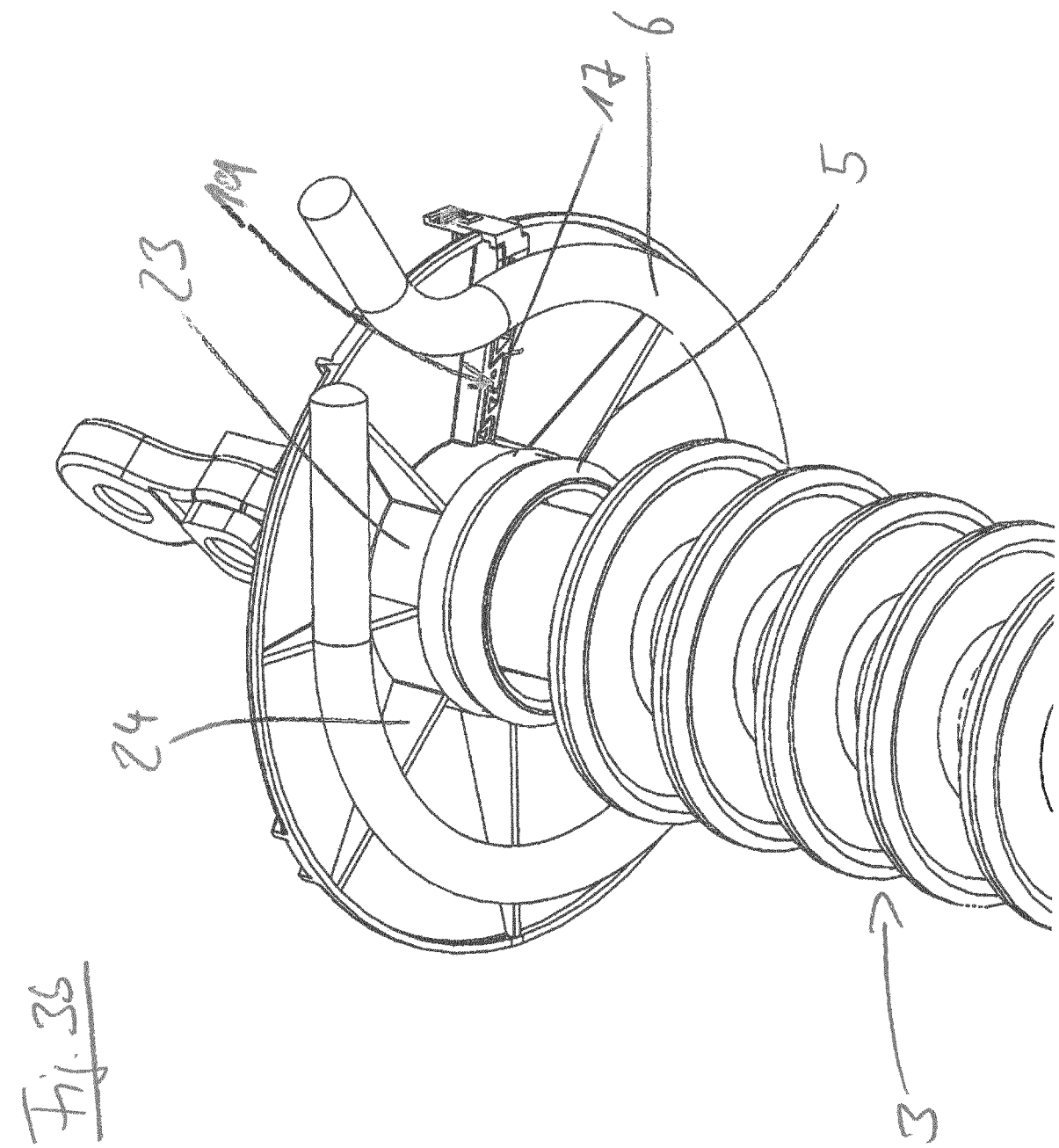

CONTAMINATION PROTECTION FOR HIGH-VOLTAGE INSULATORS

The invention relates to a contamination protection device for high-voltage insulators and to an arrangement comprising a contamination protection device and a high-voltage insulator.

Above-ground high-voltage lines are generally guided over high-voltage masts. In order to electrically isolate the high-voltage masts from the high-voltage lines, in each case high-voltage insulators are provided at the suspension points between the high-voltage lines and the high-voltage masts. In this case, long rod insulators are often used which are suspended on cross arms of the high-voltage mast, with the high-voltage line being fastened to the free end of said long rod insulators.

Even if the high-voltage insulators are designed in principle sufficiently for the desired insulation between high-voltage line and high-voltage mast, so-called ground faults occur again and again, in the case of which a high-voltage insulator is short-circuited and the high-voltage line fastened thereto is connected to ground via the high-voltage mast. Depending on the method of neutral point connection of the high-voltage power supply system and the duration of the system disturbance, these single-pole faults can have massive effects on downstream power supply systems and connected consumers, for which reason efforts are being made in the prior art to reduce these disturbances and to increase operational reliability.

Since a cause of the occurrence of ground faults has been identified as being avian fecal matter accumulating or deposited directly on the high-voltage insulators, in particular in combination with moisture, the technical specification of the International Electrotechnical Commission IEC/TS 60815-1:200—Selection and dimensioning of high-voltage insulators intended for use in polluted conditions—Part 1: Definitions, information and general principles, for example, suggests " . . . attaching deterrent devices or bird perches which are appropriate for the local fauna and the structure" in order to avoid a situation whereby birds settle on the high-voltage masts above the high-voltage insulators, do their business and thus contaminate the high-voltage insulators. However, it has been demonstrated that using corresponding devices it is only possible to reduce ground faults to a negligible extent.

Protection devices are also known in which covers are provided directly on the high-voltage mast above the high-voltage insulators on the mast cross arms, which covers are designed to keep avian fecal matter away from the high-voltage insulators. Even if it is possible by means of corresponding covers to markedly reduce the contamination of the high-voltage insulators, the covers in accordance with the prior art have some disadvantages. For example, the costs for the acquisition and installation of the covers is considerable, the mast statics are negatively influenced, in particular in the case of ice, snow and strong winds, and maintenance work on the mast cross arms and the high-voltage insulators is made more difficult.

The invention is therefore based on the object of providing a device for effectively reducing ground faults on above-ground high-voltage lines owing to avian fecal matter, in which the disadvantages known from the prior art no longer occur or only to a reduced extent.

This object is achieved by a contamination protection device as claimed in the main claim and an arrangement comprising a contamination protection device and a high-voltage insulator as claimed in claim 16. Advantageous developments are the subject matter of the dependent claims.

Accordingly, the invention relates to a contamination protection device for high-voltage insulators for fastening to the insulator cap of a high-voltage insulator comprising a protective shield, which extends radially around a leadthrough opening for the terminal element of the insulator cap, wherein the leadthrough opening is surrounded on one side of the protective shield by a fastening region for the form-fitting connection to the insulator cap, and wherein two eyes for pushing through a lug element and a lug element are provided on the other side of the protective shield, wherein the eyes are arranged in such a way that the lug element, once it has been pushed through the two eyes, extends beyond the leadthrough opening.

The invention also relates to an arrangement comprising a high-voltage insulator comprising an insulator cap and a contamination protection device according to the invention connected to the insulator cap by a form-fitting connection.

The contamination protection device according to the invention provides effective protection from contamination caused by birds, wherein the avian fecal matter in particular is kept away from the high-voltage insulator by the protective shield.

The invention has identified that the insulator caps which are generally provided for tying to a high-voltage mast in the case of high-voltage insulators, in particular when they are designed as long rod insulators, are particularly suitable for having a contamination protection device fastened thereto. In this case, the fastening can be achieved initially by a form-fitting connection between the fastening region of the contamination protection device and the insulator cap, for which purpose the terminal element of the insulator cap with which the insulator cap and therefore the high-voltage insulator are ultimately fastened to a high-voltage mast is led through the leadthrough opening in the contamination protection device. Then, the contamination protection device is secured on the insulator cap with the aid of the lug element by virtue of the lug element being pushed, successively, through one eye on the protective shield, the terminal element of the insulator cap which has been led through the leadthrough opening and finally the other eye on the protective shield. If the insulator cap is, for example, a fork-shaped cap comprising two limbs spaced apart from one another, the lug element can be pushed through between the two limbs of the fork.

The fact that the protective shield extends radially around the leadthrough opening and the fasting region, which interacts with the insulator cap, ensures that the protective shield extends over the entire circumference of the high-voltage insulator. In this case, the protective shield can cover the high-voltage insulator, i.e. can preferably be dimensioned in such a way that the dimension of the protective shield perpendicular to the longitudinal axis of the high-voltage insulator in all directions is equal to or greater than the respective greatest dimension of the high-voltage insulator shaft or the insulator shields arranged thereon.

A physical change to the high-voltage insulator, the insulator cap and/or the high-voltage mast is not generally necessary for the installation of a contamination protection device according to the invention, with the result that it is still possible to have recourse to standardized and already permitted component parts.

Since the contamination protection device according to the invention is arranged on the insulator cap and therefore on the ground potential side of the high-voltage insulator, it also does not need to meet any particular electrical requirements.

It is preferred if the contamination protection device has a radial installation opening, which runs from the leadthrough opening up to the outer edge of the protective shield, for laterally leading through the terminal element of the insulator cap of the contamination protection device. By means of a corresponding installation opening, the contamination protection device can be pushed laterally onto the insulator cap, with the result that installation of the contamination protection device is possible even in the case of an insulator cap tied to a high-voltage mast.

It is preferred if pins of a dovetail joint are provided on both sides of the installation opening for optionally closing the installation opening. Once the contamination protection device has been pushed laterally onto the insulator cap, the pins can be brought into overlap on both sides of the installation opening and brought into engagement with one another by a closing movement substantially perpendicular to the protective shield in order thus to produce the dovetail joint.

The pins can in this case be beveled slightly in the direction perpendicular to the protective shield in order to facilitate the closing of the dovetail joint. It is preferred that in each case one locking tab is provided at the end of the pins, said locking tab latching in after the closing operation of the dovetail closures. It is furthermore preferred if, alternatively or additionally, a latching closure is provided at the outer rim of the protective shield for securing the dovetail joint to prevent unintentional opening. In this case, both the locking tabs and the latching closure can be designed in particular to prevent an unintentional relative movement of the pins on both sides of the installation opening in the direction perpendicular to the protective shield, for example as a result of the effect of wind, with the result that the dovetail joint is permanently secured.

The lug element used for securing the contamination protection device preferably has a head for bearing against one eye in the pushed-through state and a barb, remote therefrom, for engaging behind the other eye in the pushed-through state. By virtue of a corresponding configuration, the lug element is secured directly to prevent it from sliding out when it is properly pushed through the two eyes on the protective shield.

It is preferred if the lug element extends beyond the barb by at least 25%, preferably at least 33%, of the spacing between the head and the barb. It has been demonstrated that the handling of the contamination protection device and in particular the pushing of the lug element through the two eyes of the protective shield can be significantly simplified and in particular is possible without the use of a tool if the lug element is extended beyond the section between the head and the barb which is relevant for the ultimate securing of the contamination protection device.

Preferably, the leadthrough opening is surrounded on the other side of the protective shield by a circumferential rim protruding out from the protective shield. A corresponding rim can be used to prevent the possibility of contamination and/or liquids which may accumulate on the protective shield passing through the leadthrough opening and then running along the high-voltage insulator. If a corresponding rim is provided, the two eyes can be integrated in said rim.

The circumferential rim can have a guide for a cable tie on its outer side. In particular when the leadthrough opening and the circumferential rim are designed to bear against the terminal element of the insulator cap, it is possible for a friction fit to be achieved between the circumferential rim and the terminal element by virtue of the cable tie guided along the rim being drawn tight, with which friction fit it is possible for the contamination protection device to additionally be secured on the insulator cap of a high-voltage insulator. In particular when the two eyes are integrated in the circumferential rim, it is preferred if the guide of the cable tie is configured in such a way that a cable tie led through there also extends beyond the head of the lug element. By virtue of the cable tie, therefore, additional securing of the lug element to prevent it from unintentionally sliding out of the eyes is achieved.

It is preferred if the protective shield has at least one optionally openable aperture emerging from the rim of the protective shield for leading through the fastening arm of an arc protection ring. If the contamination protection device is intended to be installed on a high-voltage insulator having an arc protection ring, the aperture can be opened, for example by breaking or cutting out the material closing the aperture, in order that the fastening arm of the arc protection ring can be led through, wherein the fastening arm can generally move relative to the contamination protection device in the event of the insulator being deflected, for example as a result of a wind load. It is preferred if the contamination protection device has at least two, further preferably four or more corresponding openable apertures. By virtue of a suitable arrangement of the apertures, the contamination protection device can be suitable for different embodiments of high-voltage insulators, insulator caps and/or arc protection rings, wherein the aperture suitable for a specific embodiment of a high-voltage insulator having an arc protection ring can then be opened.

It is preferred if the aperture(s) is or are surrounded on the other side of the protective shield in each case by a rim protruding out from the protective shield. In a manner comparable to the rim described above which runs circumferentially around the leadthrough opening, it is possible by means of a rim around an aperture to prevent contamination and/or liquids from passing through an open aperture and then running along, for example, the fastening arm of the arc protection ring and/or, with simultaneous action of the wind, contaminating the insulator surface.

It is preferred if the fastening region is in the form of a hat and is designed to be reverse-drawn over the insulator cap. By virtue of corresponding shaping, a particularly effective form-fitting connection can be achieved between the fastening region and the insulator cap. The term "in the form of a hat" in this case includes both embodiment variants in which the protective shield adjoins the lower end of the hat-shaped region in the manner of a "brim" and those in which the roof of the hat-shaped region merges directly with the protective shield.

It is preferred if the protective shield is inclined towards the side of the fastening region. Thus, the protective shield in the installed state of the contamination protection device on the insulator cap of a high high-voltage insulator is generally inclined in such a way that rainwater flows away to the outside. As a result of a corresponding inclination, any avian fecal matter which may be there on the protective shield can be washed away, as a result of which natural cleaning of the protective shield is achieved. The inclination of the protective shield is preferably 10° to 30°, further preferably 20° with respect to the horizontal.

It is further preferred if a drop edge is provided on the outer edge of the protective shield. As a result, it is possible to ensure that rainwater flowing away over the protective shield or avian fecal matter softened thereby does not come onto the lower side of the protective shield inwards and as a result onto the high-voltage insulator. The drop edge can also be in the form of a rim element, on which the above-described latching closure is arranged for securing the dovetail joint.

The contamination protection device can be produced from plastic. In this case, the plastic can be selected such that the contamination protection device is in principle sufficiently flexible to widen, for example, the installation opening in such a way that the contamination protection device can be pushed laterally onto a high-voltage insulator or to be able to close or open the dovetail joint. On the other hand, the contamination protection device should be sufficiently inflexible to maintain its basic shape under wind loading and to be able to ensure the desired contamination protection. In order to achieve this, the protective shield can also have radial reinforcing struts on the side of the fastening region.

Reference will be made to the above embodiments for explaining the arrangement according to the invention.

Figure 3A:
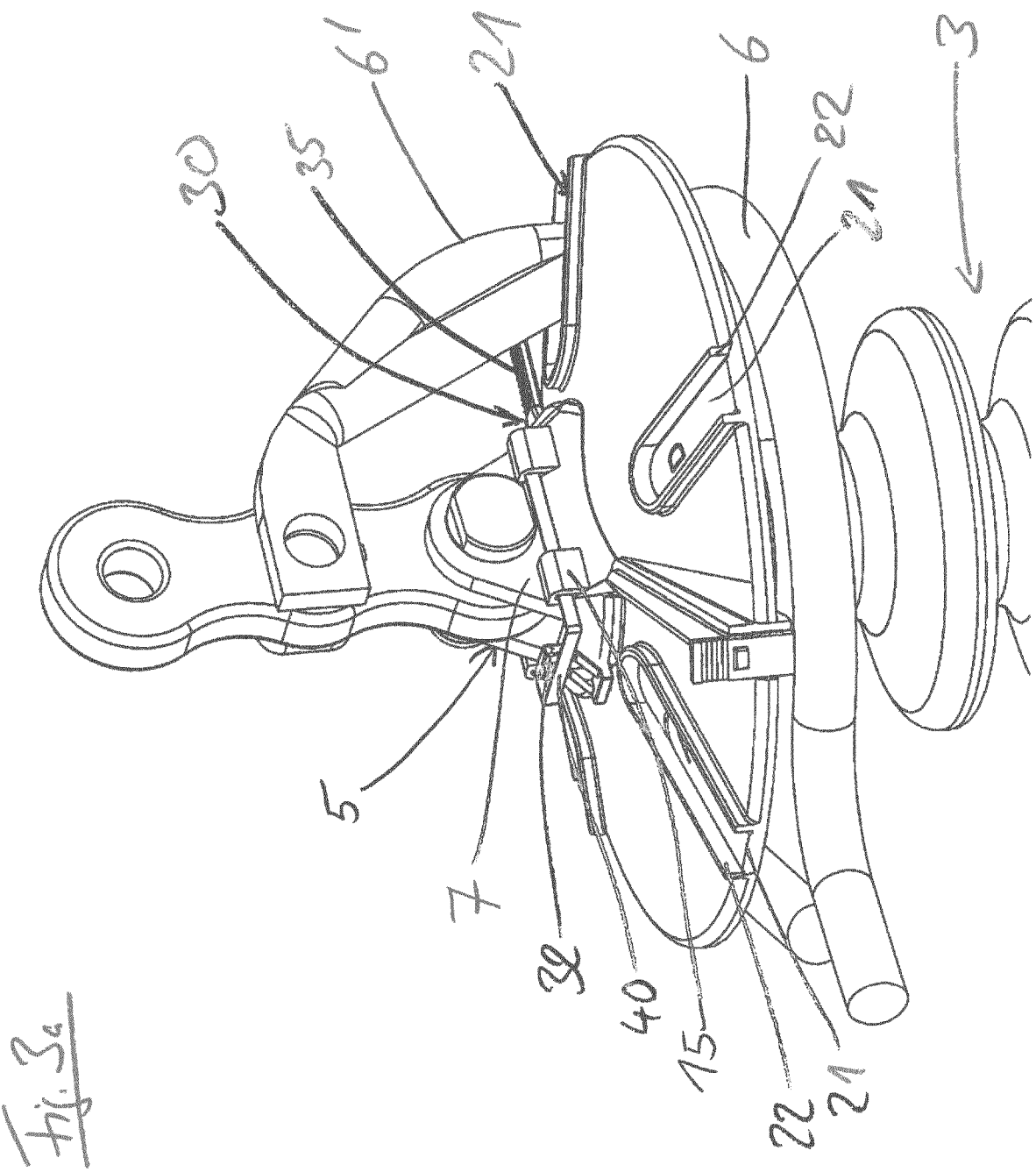

The invention will now be described by way of example using an advantageous embodiment with reference to the attached drawings, in which:

FIG. 1 shows a schematic illustration of a high-voltage invention comprising high-voltage insulators with contamination protection devices according to the invention;

FIGS. 2a, b show schematic detail illustrations of a contamination protection device according to the invention shown in FIG. 1; and FIGS. 3a, b show schematic detail illustrations of an arrangement comprising the contamination protection device shown in FIGS. 2a, b and a high-voltage insulator shown in FIG. 1.

FIG. 1 shows a high-voltage mast 1 with high-voltage lines 2 suspended thereon. The high-voltage lines 2 are fastened to the cross arms 4 via high-voltage insulators 3, which electrically isolate the high-voltage lines 2 from the high-voltage mast 1 and therefore from ground potential. In order to fasten the high-voltage insulators 3 to the cross arms 4, said insulators have insulator caps 5.

In each case one arc protection ring 6 is provided at the upper and lower ends on the high-voltage insulators 3, with any arc which may arise being guided away beyond the high-voltage insulator 3 between said arc protection rings in order not to damage the high-voltage insulator 3 itself.

Furthermore, a contamination protection device 10 according to the invention is provided at the upper end of each high-voltage insulator 3.

FIGS. 2a, b show the contamination protection device 10 used in FIG. 1 in the uninstalled state, whereas FIGS. 3a, b show the contamination protection device 10 in the state in which it is installed on a high-voltage insulator 3, wherein the high-voltage insulator 3 has an arc protection ring. The contamination protection device 10 is produced integrally from plastic.

The contamination protection device 10 has a circular protective shield 11, with a leadthrough opening 12 being provided in the center thereof for the terminal element 7 of the insulator cap 5. The leadthrough opening 12 is surrounded on the upper side of the protective shield 11 by a circumferential rim 13, wherein the leadthrough opening 12 and the circumferential rim 13 are designed in such a way that, in the installed state of the contamination protection device 10, they bear against the terminal element 7 of the insulator cap 5 (cf. FIGS. 3a, b).

On two opposite sides of the leadthrough opening 12, in each case one eye 14 is provided in the rim 13 for pushing through a lug element 30.

The lug element 30, in the production state, is joined to the rest of the contamination protection device 10 via a material bridge 31, wherein the material bridge 31 can be detached without the use of a tool for installing the contamination protection device 10. The lug element 30 is elongate and has a head 32 and a barb 33 arranged remote therefrom. The spacing between the head 32 and the barb 33 in this case substantially corresponds to the spacing between the two eyes 14 on the protective shield 11. Starting from the head 32, the lug element 30 extends further with a grip section 35 beyond the barb 33 by approximately 25% of the mentioned spacing.

If the contamination protection device 10 is located on an insulator cap 3 in such a way that the terminal element 7 of said insulator cap protrudes through the leadthrough opening 12, the lug element 30, which has previously separated from the protective shield 11, is pushed in through one eye 14, then led through the terminal element 7 and finally pushed through the other eye 14. Then, the lug element 30 can be pulled at the grip section 35 until the barb 33 latches in. The lug element 30 then bears with its head 32 against one eye 14 and with its barb 33 against the other eye 14 and is thereby already in principle secured in this position by the barb 33.

Additional securing is achieved by a cable tie 40, which is guided by guides 15 on the circumferential rim 13 in such a way that it extends beyond the head 32 of the lug element 30 and therefore secures said lug element in its position. If the cable tie 40 is drawn sufficiently tight, furthermore a friction fit is produced between the circumferential rim 13 and the terminal element 7 owing to the resultant elastic deformation of the circumferential rim 13, and this friction fit will further secure the contamination protection device 10 overall with respect to the insulator cap.

In order to be able to install the contamination protection device 10 even on an already installed high-voltage insulator 3, the protective shield 11 has a radial installation opening 17, which runs from the leadthrough opening 12 up to the outer edge 16 of the protective shield 11, for leading through the terminal element 7 of the insulator cap 5 laterally. In this case, pins 18 of a dovetail joint 19 are provided on both sides of the installation opening 17 for optionally closing the installation opening 17, as is shown in FIGS. 3a, b. In order to secure the dovetail joint 19 in the closed state, in each case one locking tab 18' is provided at the end of some of the pins and a latching closure 20 is provided at the outer edge 16 of the protective shield 11, by means of which unintentional release of the dovetail joint 19, for example owing to the impact of wind, can be effectively avoided.

Starting from its outer edge 16, four apertures 21 are positioned on the protective shield 11, said apertures being capable of optionally being opened by virtue of the material covering the apertures 21 being removed. For this purpose, a depression is provided along the outer edge of each aperture 21, with it being possible for the material in question to simply be cut out there. The apertures 21 are arranged in such a way that they can be used in each case for leading through the fastening arm 6' of an arc protection ring 6 in a specific configuration. Depending on the actual configuration, the suitable aperture 21 can be opened.

The apertures 21 are each surrounded on the upper side of the protective shield 11 by a rim 22, with which liquids and contamination accumulating on the protective shield 11 can be kept away from an open aperture 21.

The leadthrough opening 12 is surrounded on the lower side of the protective shield 11 by a fastening region 23 configured in the form of a hat, which fastening region can interact in form-fitting manner with the insulator cap 5 of a high-voltage insulator 3. Furthermore, radial reinforcing struts 24 are provided on the lower side of the protective shield 11, said struts imparting sufficient rigidity to the contamination protection device 10 despite the elasticity required for the installation in order that the contamination protection device 10 is not so severely deformed during wind loading that it can no longer perform its function.

The protective shield 11 is overall inclined towards the outer edge 16 such that, given proper installation, rain accumulating thereon flows away towards the outer edge 16. The outer edge 16 is in this case in the form of a drop edge.

The invention claimed is:

1. A contamination protection device (10) for high-voltage insulators (3) for fastening to the insulator cap (5) of a high-voltage insulator (3) comprising a protective shield (11), which extends radially around a leadthrough opening (12) for the terminal element (7) of the insulator cap (5), wherein the leadthrough opening (12) is surrounded on one side of the protective shield (11) by a fastening region (23) for the form-fitting connection to the insulator cap (5), characterized in that two eyes (14) for pushing through a lug element (30) and a lug element (30) are provided on the other side of the protective shield (11), wherein the eyes (14) are arranged in such a way that the lug element (30), once it has been pushed through the two eyes (14), extends beyond the leadthrough opening (12), characterized in that a radial installation opening (17), which runs from the leadthrough opening (12) up to outer edge (16) of the protective shield (11), is provided for laterally leading through the terminal element (7) of the insulator cap (5), and further characterized in that pins (18) of a dovetail joint (19) are provided on both sides of the installation opening (17) for optionally closing the installation opening (17), wherein preferably at least some of the pins (18) have locking tabs (18') for securing the dovetail joint (19) in the closed position.

2. The contamination protection device of claim 1, characterized in that the contamination protection device (10) is produced from plastic, wherein the plastic is in this case selected such that the contamination protection device (10) is in principle sufficiently flexible to widen the installation opening (17) in such a way that the contamination protection device (10) can be pushed laterally onto the high-voltage insulator (3) or to be able to close or open the dovetail joint (19).

3. The contamination protection device as claimed in claim 1, characterized in that a latching closure (20) is provided at the outer rim (16) of the protective shield (12) for securing the dovetail joint (19) to prevent unintentional opening.

4. The contamination protection device as claimed in claim 1, characterized in that the lug element (30) has a head (32) for bearing against one eye (14) in the pushed-through state and a barb (33), remote therefrom, for engaging behind the other eye (14) in the pushed-through state.

5. The contamination protection device as claimed in claim 4, characterized in that the lug element (30) extends beyond the barb (33) by at least 25% of the spacing between the head (32) and the barb (33).

6. The contamination protection device as claimed in claim 4, characterized in that the lug element (30) extends beyond the barb (33) by at least 33% of the spacing between the head (32) and the barb (33).

7. The contamination protection device as claimed in claim 1, characterized in that the leadthrough opening (12) is surrounded on the other side of the protective shield (11) by a circumferential rim (13) protruding out from the protective shield (11).

8. The contamination protection device as claimed in claim 7, characterized in that the two eyes (14) are integrated in said rim.

9. The contamination protection device as claimed in claim 7, characterized in that the circumferential rim (13) has a guide (15) for a cable tie (40) on its outer side.

10. The contamination protection device as claimed in claim 9, wherein the guide (15) is configured in such a way that a cable tie (40) led through there also extends beyond the head (32) of the pushed-through lug element (30).

11. The contamination protection device as claimed in claim 1, characterized in that the protective shield (11) has at least one optionally openable aperture (21) emerging from the rim (16) of the protective shield (11) for leading through the fastening arm (6') of an arc protection ring (6).

12. The contamination protection device as claimed in claim 11, characterized in that the protective shield (11) has at least at least two optionally openable apertures (21) emerging from the rim (16) of the protective shield (11).

13. The contamination protection device as claimed in claim 11, characterized in that the protective shield (11) has at least at least four optionally openable apertures (21) emerging from the rim (16) of the protective shield (11).

14. The contamination protection device as claimed in claim 11, characterized in that the at least one aperture (21) is surrounded on the other side of the protective shield (11) in each case by a rim (22) protruding out from the protective shield (11).

15. The contamination protection device as claimed in claim 1, characterized in that the fastening region (23) is configured in the form of a hat.

16. The contamination protection device as claimed in claim 1, characterized in that the protective shield (11) is inclined towards the side of the fastening region (23).

17. The device as claimed in claim 1, characterized in that a drop edge is provided on the outer edge (16) of the protective shield (11).

18. The contamination protection device as claimed in claim 1, characterized in that the protective shield (11) has radial reinforcing struts (24) on the side of the fastening region (23).

19. An arrangement comprising a high-voltage insulator (3) comprising an insulator cap (5) and a contamination protection device (10) arranged on the insulator cap (5), wherein the contamination protection device (10) is designed as claimed in claim 1 and is connected to the insulator cap (5) by means of a form-fitting connection.

20. The arrangement as claimed in claim 19, characterized in that the insulator cap (5) is a fork-shaped cap and/or the high-voltage insulator (3) has an arc protection ring (6) in the region of the insulator cap (5).

* * * * *